United States Patent
Converse et al.

(10) Patent No.: US 11,731,345 B2
(45) Date of Patent: *Aug. 22, 2023

(54) SYSTEMS AND METHODS FOR RESIN RECOVERY IN ADDITIVE MANUFACTURING

(71) Applicant: Carbon, Inc., Redwood City, CA (US)

(72) Inventors: Courtney F. Converse, Los Altos, CA (US); Allison Light, Orinda, CA (US); W. Ryan Powell, Sunnyvale, CA (US); Mateusz Marek Wojtaszek, Mount Prospect, IL (US)

(73) Assignee: Carbon, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,641

(22) Filed: Jan. 6, 2022

(65) Prior Publication Data

US 2022/0250312 A1 Aug. 11, 2022

Related U.S. Application Data

(63) Continuation of application No. 17/263,275, filed as application No. PCT/US2019/028535 on Apr. 22, 2019, now Pat. No. 11,247,389.

(Continued)

(51) Int. Cl.
*B29C 64/124* (2017.01)
*B33Y 10/00* (2015.01)
(Continued)

(52) U.S. Cl.
CPC .......... *B29C 64/124* (2017.08); *B29C 64/176* (2017.08); *B29C 64/357* (2017.08);
(Continued)

(58) Field of Classification Search
CPC ... B29C 64/124; B29C 64/393; B29C 64/176; B29C 64/357; B33Y 50/02; B33Y 30/00; B33Y 40/00; B33Y 10/00
See application file for complete search history.

(56) References Cited

U.S. PATENT DOCUMENTS 3,013,365 A 12/1961 Harper
4,087,924 A 5/1978 Fujimoro et al.
(Continued)

FOREIGN PATENT DOCUMENTS

CN 104303105 A 1/2015
DE 102014010501 A1 1/2016
(Continued)

OTHER PUBLICATIONS

International Preliminary Report on Patentability for PCT/US2019/028535 dated Jun. 2, 2020, 14 pages.
(Continued)

*Primary Examiner* — Monica A Huson
*Assistant Examiner* — Kelsey C Grace
(74) *Attorney, Agent, or Firm* — Myers Bigel, P.A.

(57) ABSTRACT

A method of producing multiple batches of objects by stereolithography, includes the steps of: (a) dispensing an initial or subsequent batch of dual cure resin into a stereolithography apparatus, the resin including a light polymerizable component and a heat polymerizable component; (b) producing an intermediate object by light polymerization of the resin in the apparatus, wherein the intermediate object retains excess resin on a surface thereof; then (c) separating excess resin from the intermediate object; (d) blending the excess resin with additional dual cure resin to produce a subsequent batch of dual cure resin; (e) repeating steps (a) through (c), and optionally repeating step (d), to produce (Continued)

additional object(s); and (f) baking the objects, together or separately, to produce multiple batches of objects.

16 Claims, 3 Drawing Sheets

Related U.S. Application Data

(60) Provisional application No. 62/789,206, filed on Jan. 7, 2019.

(51) Int. Cl.
| | |
|---|---|
| *B33Y 30/00* | (2015.01) |
| *B33Y 40/00* | (2020.01) |
| *B33Y 50/02* | (2015.01) |
| *B29C 64/176* | (2017.01) |
| *B29C 64/357* | (2017.01) |
| *B29C 64/393* | (2017.01) |

(52) U.S. Cl.
CPC ............ *B29C 64/393* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 5,122,441 A | 6/1992 | Lawton et al. | |
| 5,236,637 A | 8/1993 | Hull | |
| 5,248,456 A | 9/1993 | Evans et al. | |
| 5,355,638 A | 10/1994 | Hoffman | |
| 5,391,072 A | 2/1995 | Lawton et al. | |
| 5,482,659 A | 1/1996 | Sauerhoefer | |
| 7,438,846 B2 | 10/2008 | John | |
| 7,709,544 B2 | 5/2010 | Doyle et al. | |
| 7,845,930 B2 | 12/2010 | Shkolnik et al. | |
| 7,892,474 B2 | 2/2011 | Shkolnik et al. | |
| 8,110,135 B2 | 2/2012 | El-Siblani | |
| 8,735,049 B2 | 5/2014 | Vest | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,498,920 B2 | 11/2016 | Desimone et al. | |
| 9,511,546 B2 | 12/2016 | Chen et al. | |
| 9,592,539 B2 | 3/2017 | Dunn et al. | |
| 9,993,974 B2 | 6/2018 | Desimone et al. | |
| 10,016,938 B2 | 7/2018 | Desimone et al. | |
| 10,093,064 B2 | 10/2018 | Desimone et al. | |
| 10,144,181 B2 | 12/2018 | Desimone et al. | |
| 10,150,253 B2 | 12/2018 | Desimone et al. | |
| 10,596,755 B2 | 3/2020 | Desimone et al. | |
| 10,618,215 B2 | 4/2020 | Desimone et al. | |
| 10,913,206 B2 | 2/2021 | Donovan et al. | |
| 2003/0206820 A1* | 11/2003 | Keicher ................ | B23K 26/32 419/9 |
| 2004/0148048 A1* | 7/2004 | Farnworth ............ | B29C 64/135 382/141 |
| 2004/0159340 A1 | 8/2004 | Hiatt et al. | |
| 2006/0022379 A1 | 2/2006 | Wicker et al. | |
| 2007/0179655 A1 | 8/2007 | Farnworth | |
| 2008/0087298 A1 | 4/2008 | Katou et al. | |
| 2009/0283119 A1 | 11/2009 | Moussa et al. | |
| 2011/0089610 A1 | 4/2011 | El-Siblani et al. | |
| 2011/0309554 A1* | 12/2011 | Liska ................... | B29C 64/135 264/401 |
| 2013/0292862 A1 | 11/2013 | Joyce | |
| 2013/0295212 A1 | 11/2013 | Chen et al. | |
| 2015/0331402 A1 | 11/2015 | Lin et al. | |
| 2015/0360419 A1 | 12/2015 | Willis et al. | |
| 2016/0137839 A1 | 5/2016 | Rolland et al. | |
| 2017/0129167 A1 | 5/2017 | Castanon | |
| 2017/0129169 A1 | 5/2017 | Batchelder et al. | |
| 2017/0173872 A1 | 6/2017 | McCall et al. | |
| 2017/0312763 A1 | 11/2017 | Mackel et al. | |
| 2018/0029311 A1 | 2/2018 | Depalma et al. | |
| 2018/0304526 A1* | 10/2018 | Feller ................ | B33Y 70/00 |
| 2019/0029311 A1 | 1/2019 | Shin et al. | |
| 2019/0126547 A1 | 5/2019 | Desimone et al. | |
| 2019/0224917 A1 | 7/2019 | Venkatakrishnan et al. | |
| 2019/0389127 A1 | 12/2019 | Desimone et al. | |
| 2020/0139617 A1 | 5/2020 | Desimone et al. | |
| 2020/0215811 A1 | 7/2020 | Friedrich et al. | |
| 2020/0337813 A1 | 10/2020 | Kirchner et al. | |
| 2021/0086450 A1 | 3/2021 | Murillo et al. | |
| 2021/0323234 A1 | 10/2021 | Day et al. | |

FOREIGN PATENT DOCUMENTS

| | | |
|---|---|---|
| EP | 1700656 A2 | 9/2006 |
| EP | 1700686 A2 | 9/2006 |
| JP | 2001342204 A | 12/2001 |
| JP | 2015120261 A | 7/2015 |
| WO | 0172501 A1 | 10/2001 |
| WO | 2011086450 A2 | 7/2011 |
| WO | 2017194177 A1 | 11/2017 |
| WO | 2018111548 A1 | 6/2018 |
| WO | 2019209732 A1 | 10/2019 |

OTHER PUBLICATIONS

International Search Report and Written Opinion for PCT/US2019/028535 dated Sep. 17, 2019, 13 pages.

International Search Report and Written Opinion for PCT/US2019/053188 dated Dec. 19, 2019, 13 pages.

"International Preliminary Report on Patentability", for PCT/US2019/028539 dated Mar. 24, 2020, 21 pages.

"International Search Report and the Written Opinion of the International Searching Authority corresponding to International Patent Application No. PCT/US2019/028539 (17 pages) (dated Oct. 1, 2019)".

Dendukuri, Dhananjay , et al., "Continuous-flow lithography for high-throughput microparticle synthesis", Nature Materials, 5, 2006, 365-369.

Dendukuri, Dhananjay , et al., "Modeling of Oxygen-Inhibited Free Radical Photopolymerization in a PDMS Microfluidic Device", Macromolecules, 41, 2008, 8547-8556.

Dendukuri, Dhananjay , et al., "Stop-flow lithography in a microfluidic device", The Royal Society of Chemistry, Lab on a Chip, 7, 2007, 818-828.

Morelli, Dean , "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, 37 pp.

Pan, Yayue , et al., "A Fast Mask Projection Stereolithography Process for Fabricating Digital Models in Minutes", J. Manufacturing Sci. and Eng. 134(5), 2012, 051011-1-9.

Stern, S. A., "The "Barrer" Permeability Unit", Journal of Polymer Science: Part A-2, 6(11), 1968, 1933-1934.

Tumbleston, John R., et al., "Continuous liquid interface production of 3D Objects", Science, 347(6228), 2015, 1349-1352.

Yasuda, H. , et al., "Permeability of Polymer Membranes to Dissolved Oxygen", Journal of Polymer Science, 4, 1966, 1314-1316.

* cited by examiner

SYSTEMS AND METHODS FOR RESIN RECOVERY IN ADDITIVE MANUFACTURING

RELATED APPLICATIONS

This application is a continuation of U.S. patent application Ser. No. 17/263,275, filed Jan. 26, 2021, which is a 35 U.S.C. § 371 national phase entry of International Application No. PCT/US2019/028535, filed Apr. 22, 2019, which claims the benefit of U.S. Provisional Patent Application Ser. No. 62/789,206, filed Jan. 7, 2019, the disclosures of which are incorporated by reference herein in their entirety.

FIELD OF THE INVENTION

The present invention concerns methods and systems for producing multiple batches of objects by stereolithography.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of more rapid stereolithography techniques sometimes referred to as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606). The higher volumes of production and the more complex resin formulations that have accompanied these developments has, in turn, created a need for new ways to reduce waste of resin, and avoid the need to discard resin.

SUMMARY OF THE INVENTION

A method of producing multiple batches of objects by stereolithography includes the steps of:

(a) dispensing an initial batch (or in further repetitions, a subsequent batch) of dual cure resin into a stereolithography apparatus, the resin comprising a light polymerizable component and a heat polymerizable component;

(b) producing an intermediate object by light polymerization of the resin in the apparatus, wherein the intermediate object retains excess resin on a surface thereof; then (c) separating excess resin from the intermediate object;

(d) blending the excess resin with additional dual cure resin to produce a subsequent batch of dual cure resin;

(e) repeating steps (a) through (c), and optionally repeating step (d), to produce additional object(s); and (f) further curing the objects, such as by baking the objects, together or separately, to produce multiple batches of objects.

In some embodiments, the polymerizing or light polymerization is exothermic.

In some embodiments, steps (a) through (c) are repeated at least twice (e.g., at least three times) and step (d) is repeated at least once (e.g., at least two times).

In some embodiments, the objects include an open lattice (e.g., a cushion or pad, such as a midsole or helmet liner).

In some embodiments, the objects include dental models.

In some embodiments, excess resin is retained on said intermediate object in an amount by weight of at least 40, 60 or 80 percent as compared to the weight of the intermediate object.

In some embodiments, excess resin is blended with additional dual cure resin in a volume ratio of from 10:90, 20:80 or 30:70, up to 40:60, 50:50, or 60:40 (excess resin:additional dual cure resin).

In some embodiments, the separating step is carried out by centrifugal separation, gravity drainage, wiping (e.g. with a compressed gas) or a combination thereof.

In some embodiments, the excess resin is free of wash liquid in the blending step.

In some embodiments, the excess resin of step (b) has a viscosity greater than that of the dual cure resin of step (a), and the subsequent batch of dual cure resin of step (d) has a viscosity less than that of the excess resin.

In some embodiments, the initial batch and subsequent batches of dual cure resin have a viscosity of from 1,000 or 2,000 centipoise to 60,000 or 100,000 centipoise at 25 degrees centigrade.

In some embodiments, the stereolithography is top down or bottom up stereolithography (e.g., CLIP).

In some embodiments, the excess dual cure resin of step (b) has a viscosity at least 1,000 or 2,000 centipoise greater (or 10 or 20 percent greater) than that of said dual cure resin of step (a).

In some embodiments, the resin includes a polyurethane, cyanate ester, epoxy, or silicone dual cure resins.

In some embodiments, the initial batch of dual cure resin has a unique identifier assigned thereto; the blending step further comprises assigning a unique identifier to each subsequent batch of dual cure resin; and the producing step further comprises: (i) assigning a unique identifier to each object; and (ii) recording the unique identifier of the batch of resin from which each object is produced.

In some embodiments, the method further includes the step of: (g) determining and comparing at least one physical property (e.g., flexibility, elasticity, tensile strength, tear strength, impact resistance, elongation at break, strain at yield, notch sensitivity, toughness, abrasion resistance, shear strength, deformation under load, permanent deformation, coefficient of friction, fatigue index, color, clarity, etc.) of objects produced from different batches of resin (for example, to insure uniformity or consistency of objects within a given tolerance even though produced from different resin batches).

In some embodiments, the determining and comparing step further includes: (i) determining the unique identity of each said object, and (ii) retrieving the unique identity of the resin batch recorded for said object.

A system for carrying out additive manufacturing includes:

(a) a resin dispenser for dispensing a dual cure resin;

(b) at least one stereolithography apparatus operatively associated with the resin dispenser;

(c) a separator (e.g., a centrifugal separator) configured for separating excess resin retained on the surface of objects produced on the stereolithography apparatus; and (d) a blender operatively associated with said separator and configured for mixing excess resin with additional dual cure resin to produce a blended resin, the blended resin useful for carrying out additive manufacturing in said at least one stereolithography apparatus.

In some embodiments, the system is configured for carrying out a method as described herein.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

1. Resin Dispensing and Additive Manufacturing Steps.

Dual cure resins are preferred for carrying out the present invention. Such resins are known and described in, for example, U.S. Pat. Nos. 9,676,963, 9,453,142 and 9,598,606 to Rolland et al. Particular examples of suitable dual cure resins include, but are not limited to, Carbon Inc. medical polyurethane, elastomeric polyurethane, rigid polyurethane, flexible polyurethane, cyanate ester, epoxy, and silicone dual cure resins, all available from Carbon, Inc., 1089 Mills Way, Redwood City, Calif. 94063 USA.

Figure 1:
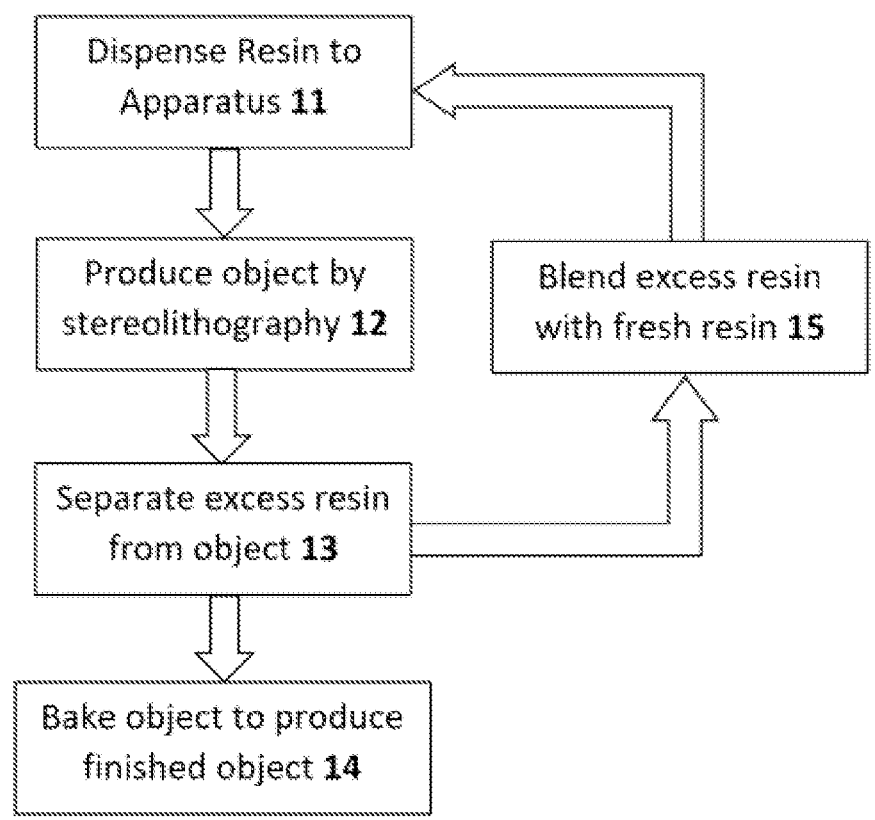
FIG. 1 schematically illustrates a first embodiment of the present invention.
Figure 2:
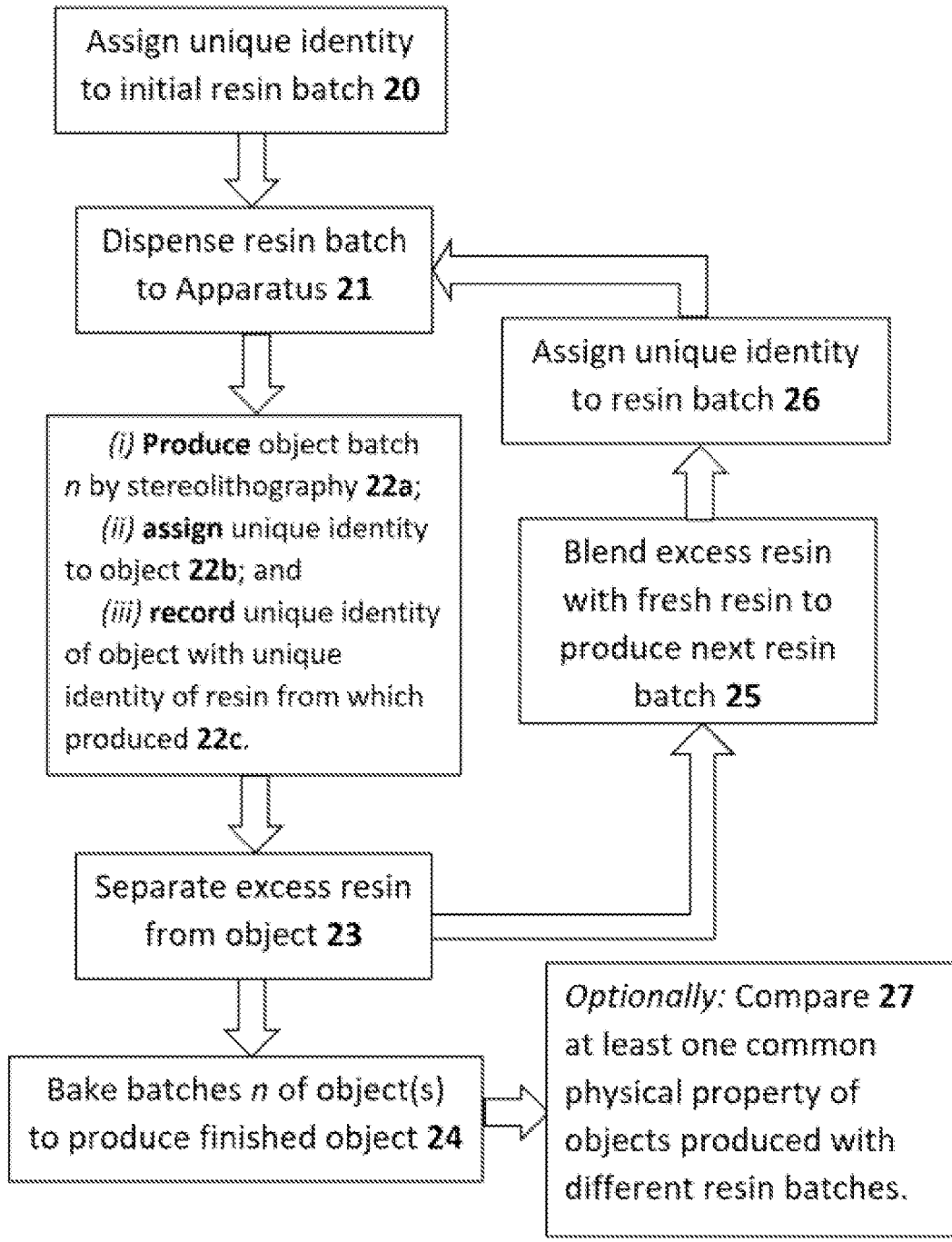
FIG. 2 schematically illustrates a second embodiment of the present invention.

Resins may be dispensed (FIG. 1 step 11; FIG. 2 step 21) in any suitable manner, including as single component (1K) systems, or provided as two component (2K) systems that are mixed together when dispensed (e.g., blended upon dispensing). Dispensing may be manual or automated, and may employ a metering and dispensing device such as described in J. Rolland, C. Converse, O Nazarian, and M. Panzer, PCT Patent Application Publication No. WO 2018/237038 (published 27 Dec. 2018), the disclosure of which is incorporated herein by reference.

Techniques for producing an intermediate object, or "green" intermediate, from such resins by additive manufacturing (FIG. 1 step 12; FIG. 2 step 22a) are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, US Patent Application Pub. No. US 2017/0129167 (May 11, 2017); B. Feller, US Pat App. Pub. No. US 2018/0243976 (published Aug. 30, 2018); M. Panzer and J. Tumbleston, US Pat App Pub. No. US 2018/0126630 (published May 10, 2018); and K. Willis and B. Adzima, US Pat App Pub. No. US 2018/0290374 (Oct. 11, 2018).

2. Resin Recovery and Return; Baking.

An embodiment of the present invention is illustrated in the chart of FIG. 1. The method, for producing multiple batches of objects by stereolithography, includes the steps of:

(a) dispensing an initial or subsequent batch of dual cure resin (11) into a stereolithography apparatus, the resin comprising a light polymerizable component and a heat polymerizable component;

(b) producing (12) an intermediate object by light polymerization (typically in an exothermic polymerization reaction) of the resin in the apparatus, wherein the intermediate object retains excess resin on the surface thereof; then (c) separating (13) excess resin from the intermediate object;

(d) blending (15) the excess resin with additional dual cure resin to produce a subsequent batch of dual cure resin;

(e) repeating steps (a) through (c), and optionally repeating step (d), to produce additional object(s); and (f) further curing the objects, such as by baking (14) the objects (e.g., by heating and/or microwave irradiating), together or separately, to produce multiple batches of objects.

The embodiment of FIG. 2 is similar to that of FIG. 1, with dispensing (21), producing (22a), separating (23), blending (25), and baking (24) steps carried out in like manner. However, the embodiment of FIG. 2 further includes the steps of assigning a unique identity to the initial resin batch (20) and to subsequent resin batches (26), assigning a unique identity to the objects produced (22b), and recording the unique identity of each object produced in association with the unique identity of the resin batch from which each object is produced (22c). Such unique identities can be assigned to resins and objects, and recorded to a database, by any suitable means, such as described in J. Desimone, R. Goldman, S. Pollack, and R. Liu, PCT Patent Application Publication No. WO2018/169826 (published 20 Sep. 2018) and J. Rolland, C. Converse, O Nazarian, and M. Panzer, PCT Patent Application Publication No. WO 2018/

237038 (published 27 Dec. 2018), the disclosures of which are incorporated herein by reference.

In some embodiments, steps (a) through (c) are repeated at least twice (e.g., at least three times) and step (d) is repeated at least once (e.g., at least two times).

Any of a variety of different types of objects can be produced, including open lattice structures (e.g., a cushion or pad, such as a midsole or helmet liner), dental models, or any of the variety of objects described in J. Rolland et al., U.S. Pat. Nos. 9,676,963, 9,453,142 and 9,598,606, the disclosures of which are incorporated herein by reference.

In some embodiments, considerable excess resin is retained on the surface of the intermediate object, which the present invention advantageously captures and returns for use, rather than washes off for disposal. For example, in some embodiments, excess resin is retained on the intermediate object in an amount by weight of at least 40, 60 or 80 percent as compared to the weight of the intermediate object (that is, the amount of retained resin equals weight of the intermediate object itself, multiplied by at least 0.4, 0.6, or 0.8).

Separating. The separating step can be carried out by any suitable means, such as by centrifugal separation, gravity drainage, wiping (e.g. with a compressed gas) or a combination thereof. Centrifugal separation in an enclosed chamber is currently preferred, where the collected excess resin can be drained, continuously or in a batch-wise fashion, from the enclosed chamber. When centrifugal separation is employed, the objects can be retained on their build platforms and those build platforms mounted on a rotor for spinning; the objects removed from their build platforms and placed in a basket for spinning, the objects can be removed from their build platforms and secured to retention members (such as skewers for pre-formed retention openings intentionally included in the objects), etc. In some embodiments, the interior of the centrifugal separating apparatus is coated with a non-stick material, such as described by Aizenberg et. al. in US 2015/0209198 A1, the disclosure of which is incorporated by reference herein.

Blending. The excess resin can be blended with additional dual cure resin in a volume ratio of from 10:90, 20:80 or 30:70, up to 40:60, 50:50, or 60:40 (excess resin:additional dual cure resin). Blending of the collected excess resin with additional dual cure resin (typically, the additional resin being of the same composition as was the collected excess resin prior to the excess resin passing through the producing step) can be carried out continuously or in a batch-wise manner by any suitable technique. In one embodiment, the blending is carried out in a drum with an immersion mixer, with additional resin being added until the desired viscosity of the entire blended resin is achieved. Thus, in some embodiments, the excess resin of step (b) has a viscosity greater than that of the dual cure resin of step (a), and the subsequent batch of dual cure resin of step (d) has a viscosity less than that of the excess resin (reduced viscosity being advantageous in the stereolithography processes). In some embodiments, the initial batch and subsequent batches of dual cure resin have a viscosity of from 1,000 or 2,000 centipoise to 60,000 or 100,000 centipoise at 25 degrees centigrade; and in some embodiments, the excess dual cure resin of step (b) has a viscosity at least 1,000 or 2,000 centipoise greater (or 10 or 20 percent greater) than that of the dual cure resin of step (a).

Baking. After excess resin has been separated from the intermediate object, the object is then further cured, such as by heating. Heating may be active heating (e.g., baking in an oven, such as an electric, gas, solar oven or microwave oven, or combination thereof), or passive heating (e.g., at ambient (room) temperature). Active heating will generally be more rapid than passive heating and is typically preferred, but passive heating—such as simply maintaining the intermediate at ambient temperature for a sufficient time to effect further cure—may in some embodiments also be employed.

Washing. While wash steps can be included in some embodiments of the present invention, before and/or after the separating step, in preferred embodiments wash steps are avoided (particularly prior to the separating step), and hence the excess resin is free of wash liquid in the blending step. While this serves to simplify resin blending, nevertheless, in some embodiments where an initial (or "primer") resin contains at least one diluent in a given amount, that diluent can then be used as an aid during separation (e.g., sprayed on objects prior to or during centrifugal separation), and then the (now diluted) excess resin blended with additional resin that contains a reduced amount of that diluent (that is, less than that of the primer resin), so that the appropriate chemical composition and viscosities are achieved in the blended resin.

Testing. The physical properties of objects produced by the present invention can be determined and compared in accordance with known techniques. See, e.g., T. R. Crompton, *Physical Testing of Plastics* (Smithers Rapra Technology Ltd. 2012). Objects produced from different resin batches can be compared, for example, to insure uniformity or consistency of objects within a given tolerance even though produced from different resin batches. Where unique identifiers are applied to resins and objects, and the information stored or saved, the comparing step can be facilitated by (i) determining the unique identity of each the object, and (ii) retrieving the unique identity of the resin batch recorded for the object. Examples of physical properties that can be tested and compared include, but are not limited to, flexibility, elasticity, tensile strength, tear strength, impact resistance, elongation at break, strain at yield, notch sensitivity, toughness, abrasion resistance, shear strength, deformation under load, permanent deformation, coefficient of friction, fatigue index, color, clarity, etc.

Example System

Figure 3:
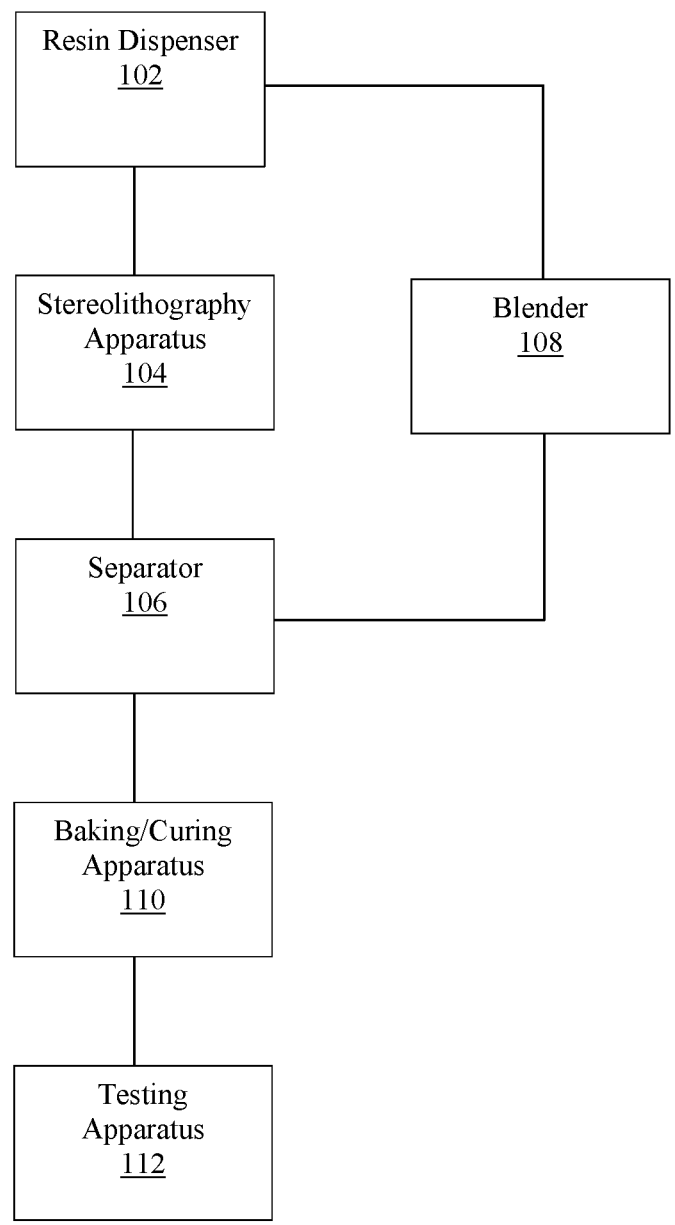
FIG. 3 schematically illustrates a system according to embodiments of the present invention.

With reference to FIG. 3, an example system (100) for carrying out additive manufacturing, includes:

(a) a resin dispenser (102) for dispensing a dual cure resin;

(b) at least one stereolithography apparatus (104) operatively associated with the resin dispenser;

(c) a separator (106) (e.g., a centrifugal separator) configured for separating excess resin retained on the surface of objects produced on the stereolithography apparatus; and (d) a blender (108) operatively associated with the separator and configured for mixing excess resin with additional dual cure resin to produce a blended resin, the blended resin useful for carrying out additive manufacturing in the at least one stereolithography apparatus.

The system may include a baking or further curing apparatus (110) and/or a testing apparatus (112) configured to carry out the testing described herein.

The foregoing is illustrative of the present invention, and is not to be construed as limiting thereof. The invention is defined by the following claims, with equivalents of the claims to be included therein.

We claim:

1. A method of producing multiple batches of objects by stereolithography, comprising the steps of:

(a) dispensing an initial or subsequent batch of dual cure resin into a stereolithography apparatus, said resin comprising a light polymerizable component and a heat polymerizable component;
(b) producing an intermediate object by light polymerization of said resin in said apparatus, wherein said intermediate object retains excess resin on a surface thereof after said producing said intermediate object, and wherein said stereolithography apparatus is a bottom up stereolithography apparatus; then
(c) separating excess resin from said intermediate object, wherein said separating step is carried out by centrifugal separation;
(d) blending said excess resin with additional dual cure resin to produce a subsequent batch of dual cure resin, said blending carried out in a blender;
(e) repeating steps (a) through (c), and optionally repeating step (d), to produce additional object(s); and
(f) baking said objects, together or separately, to produce multiple batches of objects, wherein said repeating step (e) comprises transferring said subsequent batch of dual cure resin from said blender to a resin dispenser for said dispensing step (a).

2. The method of claim 1, wherein said polymerizing or light polymerization is exothermic.

3. The method of claim 1, wherein steps (a) through (c) are repeated at least twice and step (d) is repeated at least once.

4. The method of claim 1, wherein said objects comprise an open lattice.

5. The method of claim 1, wherein said objects comprise dental models.

6. The method of claim 1, wherein excess resin is retained on said intermediate object in an amount by weight of at least 40 percent as compared to the weight of said intermediate object.

7. The method of claim 1, wherein excess resin is blended with additional dual cure resin in a volume ratio of from 10:90 up to 60:40 (excess resin:additional dual cure resin).

8. The method of claim 1, wherein said excess resin is free of wash liquid in said blending step.

9. The method of claim 1, said excess resin of step (b) having a viscosity greater than that of said dual cure resin of step (a), and said subsequent batch of dual cure resin of step (d) having a viscosity less than that of said excess resin.

10. The method of claim 1, wherein said initial batch and subsequent batches of dual cure resin have a viscosity of from 1,000 to 100,000 centipoise at 25 degrees centigrade.

11. The method of claim 1, wherein said excess dual cure resin of step (b) has a viscosity at least 1,000 centipoise greater (or 10 percent greater) than that of said dual cure resin of step (a).

12. The method of claim 1, wherein said resin comprises a polyurethane, cyanate ester, epoxy, or silicone dual cure resins.

13. The method of claim 1, wherein:
said initial batch of dual cure resin has a unique identifier assigned thereto;
said blending step further comprises assigning a unique identifier to each subsequent batch of dual cure resin; and
said producing step further comprises: (i) assigning a unique identifier to each object;
and (ii) recording the unique identifier of the batch of resin from which each object is produced.

14. The method of claim 13, further comprising the step of:
(g) determining and comparing at least one physical property of objects produced from different batches of resin (for example, to ensure uniformity or consistency of objects within a given tolerance even though produced from different resin batches).

15. The method of claim 14, wherein said determining and comparing step further comprises: (i) determining the unique identity of each said object, and (ii) retrieving the unique identity of the resin batch recorded for said object.

16. The method of claim 1, further comprising, before the separating step, mounting a build platform on which said intermediate object is retained on a rotor in a chamber or securing said intermediate object to retention members in the chamber.

* * * * *